Patented Sept. 2, 1941

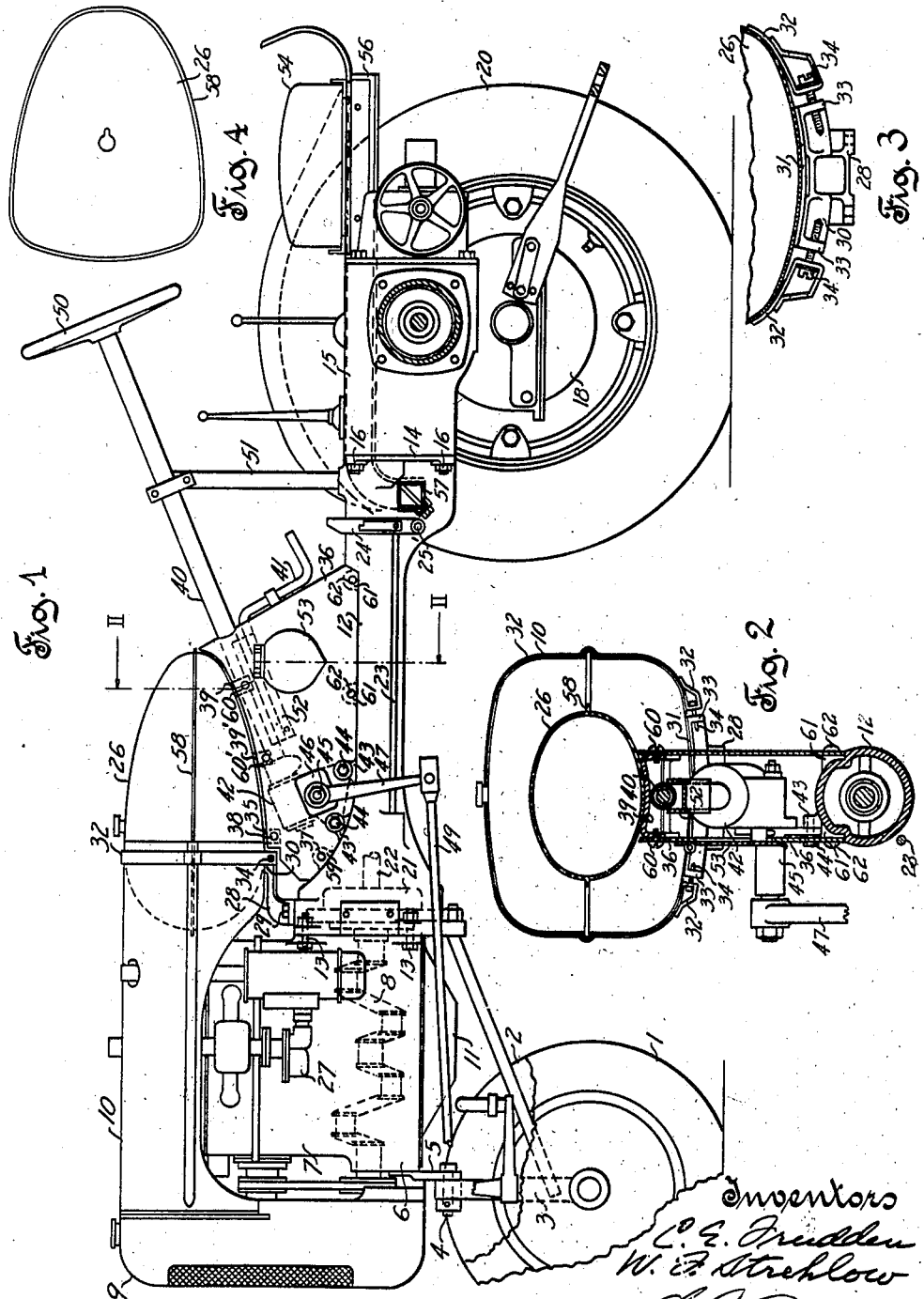

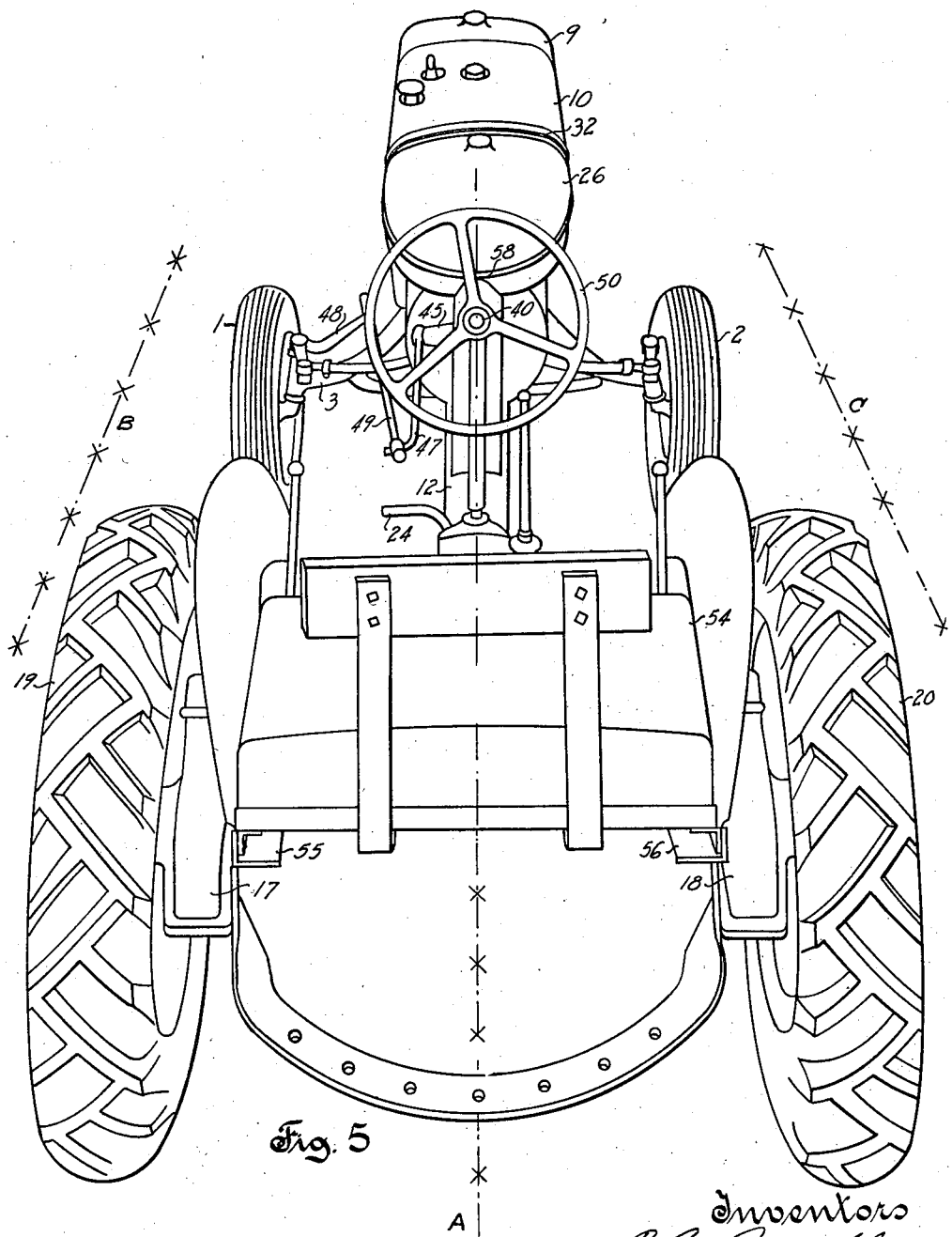

2,254,359

UNITED STATES PATENT OFFICE 2,254,359

FUEL TANK MOUNTING FOR TRACTORS

Conrad E. Frudden and Walter F. Strehlow, Wauwatosa, Wis., assignors to Allis-Chalmers Manufacturing Company, Milwaukee, Wis., a corporation of Delaware Original application May 17, 1939, Serial No. 274,164. Divided and this application February 21, 1940, Serial No. 320,105

12 Claims. (Cl. 280—5)

The invention relates to tractors and like vehicles which have a driving engine of the internal combustion type and a fuel tank installation for supplying the engine with fuel. The present application is a division of application Serial No. 274,164 filed on May 17, 1939, by Conrad E. Frudden and Walter F. Strehlow for Tractor.

In tractors of the wheel type as well as of the crawler type the engine and the fuel tank are usually placed in proximity to each other, and the fuel is fed by gravity from the tank to the carburetor of the engine. This manner of storing the fuel and feeding it to the engine is desirable because it eliminates the need for a fuel pump and for a long pipe connection between the tank and the carburetor. The driver's seat is located, according to accepted practice, at the rear of the tractor, that is, in rearwardly spaced relation to the engine, and it is desirable that the driver's forward range of vision from his seat be obstructed as little as possible by the fuel tank and its support which is preferably mounted, at least in part, on the portion of the tractor which extends between the engine and the seat.

It is an object of the invention to provide an improved fuel tank installation which meets both of the mentioned requirements, namely, the requirement of placing the fuel tank into the specified desirable position relative to the engine, and the requirement of avoiding undue obstruction of the driver's forward range of vision by the fuel tank and its support.

In row-crop tractors it is desirable under certain circumstances that the driver's forward range of vision from the seat of the rear of the tractor include a plant row which extends longitudinally of the tractor centrally between the transversely spaced rear wheels of the tractor, and particularly a substantial portion of such plant row between the front and rear ends of the tractor. It is a more specific object of the invention to provide an improved fuel tank installation for a row-crop tractor which is constructed to afford the mentioned desired range of vision, so that the driver may see the specified portion of a central plant row without uncomfortably leaning over towards one side or otherwise assuming a tiring position on the seat.

Another object of the invention is to provide an improved fuel tank mounting which affords an enclosed space for the reception of tools or other accessories.

A further object of the invention is to provide a fuel tank installation which is simple and compact in construction, conveniently assembled and disassembled, and which may be manufactured at relatively low costs.

These and other objects and advantages of the invention will be apparent from the following description of a preferred embodiment of the invention. Referring to the drawings accompanying and forming part of the specification, and in which like reference characters designate the same or similar parts in the various views:

Fig. 1 is a side view of a row-crop tractor, the left rear wheel and part of the rear axle structure at the left side of the tractor being omitted for a better disclosure of the rear part of the tractor;

Fig. 2 is an enlarged section on line II—II of Fig. 1;

Fig. 3 is an enlarged rear view of a fuel tank bracket shown in Fig. 1;

Fig. 4 is a top view of a fuel tank shown in Fig. 1; and

Fig. 5 is a perspective rear view of the tractor shown in Fig. 1, the view being taken from a point rearwardly of and above the tractor.

Referring to Figs. 1 and 5, axially spaced front wheels 1 and 2 of the tractor are mounted on opposite ends of an upwardly arched front axle 3 which has a central pivotal connection 4 with a plate 5 secured to the forward end of a motor block 6. The motor block 6 forms part of an internal combustion engine 7 which is of generally conventional design and therefore requires no detailed description, the crank shaft 8 of the engine being indicated in dotted lines in Fig. 1. A radiator and shell 9 are supportingly connected with the motor block by a suitable bracket structure (not shown), and a hood 10 is supported at its forward end on the radiator shell 9. A bottom opening of the motor block 6 is closed by an oil pan 11.

A torque tube casing 12 extends rearwardly from the motor block 6 and has a rearwardly tapering portion forming a bell housing which is secured to the motor block by bolts 13. The bell housing merges at its rear with a relatively long tubular portion of the torque tube casing, which is of relatively narrow width transversely of the tractor as shown in Figs. 2 and 5. The elongated narrow tubular portion of the torque tube casing is downwardly enlarged at its rear end as shown in Fig. 1, and the portion of the torque tube casing which extends between the forward bell housing and the rearward downward enlargement has a height substantially equal to its width as shown in Figs. 1 and 2. A flange 14 at the rear end of the torque tube casing is bolted to a gear housing 15 by means of bolts 16, the gear housing 15 forming the central part of an upwardly arched rear axle structure including the final drive casings 17 and 18 shown in Fig. 5. Mounted on axles projecting from the final drive casings 17 and 18 are rear wheels 19 and 20 of the tractor, the rear wheels being driven by power from the engine 7. The mechanism for transmitting power from the engine to the rear wheels includes a clutch 21 within the bell housing of the torque tube casing, a propeller shaft 22 which extends longitudinally through the torque tube casing, suitable change speed and differential mechanisms enclosed within the gear housing 15, and final drive gears which are enclosed within the final drive casings 17 and 18 of the arched rear axle structure. The clutch 21 is operable by a rod 23 extending along and in proximity of the torque tube casing 12, and by a clutch pedal 24 connected with the clutch rod 23 and pivotally mounted on the torque tube casing 12 at 25 as shown in Fig. 1.

A fuel tank 26 is mounted on the tractor in proximity to the engine 7 and at a suitable elevation above the carburetor 27 of the engine so that fuel may be delivered by gravity from the tank to the carburetor through a relatively short pipe line (not shown). Looking at the fuel tank from the side, as shown in Fig. 1, the fuel tank 26 presents itself in a bulbous shape somewhat similar to that of an egg, and a bracket 28 is bolted to the bell housing of the torque tube casing 12 to provide a forward support for the fuel tank. The bracket 28 is secured at its forward end to the top of the bell housing by bolts 29 and extends rearwardly over the bell housing in vertically spaced relation thereto. The bracket 28 has a rearward portion 30 of substantial width transversely of the tractor as shown in Fig. 3, the portion 30 being of comparatively short length longitudinally of the tractor and affording a raised seat for a bottom portion of the fuel tank intermediate its front and rear ends. A strip of fabric 31 is interposed between the seat 30 and the bottom of the fuel tank 26, and a metal strap 32 which embraces the rear end of the hood 10 on an intermediate portion of the fuel tank 26, is secured to downwardly projecting lugs 33 of the seat 30 by screws 34, the screws 34 being properly tightened to secure the fuel tank on the bracket 28 against tilting transversely of the tractor. The length of the seat 30 longitudinally of the tractor is somewhat greater than the width of the strap 32, as shown in Fig. 1.

It will be noted that the bracket 28 projects under the fuel tank to a point below and somewhat forwardly of the center of gravity of the fuel tank. The rear portion of the fuel tank which overhangs the bracket 28 has an upwardly curved bottom wall, and the forward portion of the fuel tank which projects under the hood 10 also has an upwardly curved bottom wall. Looking at the fuel tank from above, as shown in Figs. 4 and 5, it will be noted that the fuel tank has a rearwardly tapering portion of gradually diminishing horizontal width, and from Fig. 1 it will be noted that this portion of gradually diminishing horizontal width overlies the narrow tubular portion of the torque tube casing 12 at a substantial vertical distance therefrom, while the forward portion of the fuel tank which overlies the bell housing of the torque tube casing is spaced a relatively short vertical distance from the front portion of the bell housing. The fuel tank is preferably made of two sheet metal halves which are dished and joined together by a horizontal circumferential seam 58, the dished shape of the sheet metal halves being best shown in Fig. 2 which also indicates that a cross-section through the fuel tank in a vertical plane transversely of the tractor is more or less elliptical and that the shape of the fuel tank in that respect departs from that of a truly oviform body.

The tubular portion of the torque tube casing 12 is fluted at opposite sides for some distance rearwardly from the bell housing, and opposite vertical side walls of a sheet metal structure 36 are seated in the fluted portions of the casing 12, as shown in Fig. 2. The side walls of the sheet metal structure extend parallel to each other longitudinally of the tractor and they are spaced from each other transversely of the tractor a distance slightly shorter than the outside diameter of the tubular portion of the torque tube casing 12. The forward portions of the side walls extend over the bell housing of the torque tube casing and their bottom edges are curved to conform with the rearward taper of the bell housing, whereas the bottom edges of the rearward portions of the side walls are straight and fit into the shallow lateral recesses of the torque tube casing provided by the fluted portions at opposite sides thereof. Formed within the fluted portion at the left side of the torque tube casing are a pair of tapped bosses 61 to which the rearward portion of the left side wall of the sheet metal structure 36 is secured by a pair of screws 62. The forward portion of the left side wall of the sheet metal structure is secured to a tapped lug 59 on the bell housing by means of a screw 37. The right side wall of the sheet metal structure 36 is secured to the torque tube casing 12 in the same manner as has just been described in connection with the left side wall; that is, the rearward portion of the right side wall is retained by means of a pair of screws 62 on tapped bosses of the fluted portion at the right side of the torque tube casing, and the forward portion of the right side wall is retained by means of a screw 37 on the lug 59. The terms "right" and "left" are here used in the same sense in which they apply to Fig. 5 where the wheels 2 and 20 are at the right side of the tractor and the wheels 1 and 19 are at the left side of the tractor.

The side walls of the sheet metal structure extend upwardly from the torque tube casing 12 parallel to a vertical plane through the longitudinal axis of the torque tube casing, and each side wall has an upper edge portion adjacent to the bottom of the fuel tank 26, such edge portion extending rearwardly from a point closely adjacent to the seat 30 of the bracket 28 and being curved to conform with the upward curvature of the bottom of the fuel tank. The fuel tank does not rest, however, directly on the curved upper edges of the side walls of the sheet metal structure 36, but is held slightly spaced therefrom by a U-shaped bracket 39, best shown in Fig. 2. The bracket 39 is secured to the bottom of the fuel tank at a substantial distance rearwardly from the bracket 28 as best shown in Fig. 1, and it acts as a spacing member between the side walls of the sheet metal support 36. The bracket 39 has depending legs which fit between the side walls of the support 36, and the legs of the bracket 39 are secured to the side walls of the support by a pair of screws 60 which retain the bracket 39 in such a position on the sheet metal support that the bottom of the fuel tank 26 is separated from the curved upper edges of the side walls of the support by a slight gap as shown in Fig. 1. In order to keep the upper edges of the side walls of the support 36, forwardly of the bracket 39, properly spaced from each other two additional spacers 35 and 39' are interposed between the side walls of the sheet metal support 36, the spacer 35 being located rearwardly of and in proximity to the bracket 28, and the spacer 39' being located about midway between the bracket 39 and the bracket 28. The spacers 35 and 39' are secured to the side walls of the sheet metal support by screws 38 and 60', respectively, but as distinguished from the bracket 39 the spacers 35 and 39' are not directly secured to or in contact with the bottom of the fuel tank 26.

A rear wall connecting the side walls of the sheet metal support extends at a rearwardly and downwardly directed slope between the rearmost portion of the fuel tank and a rearward portion of the torque tube casing 12, the rear wall, like the side walls of the sheet metal support, having no direct load bearing contact with the fuel tank. The side and rear walls of the sheet metal support are preferably formed in one piece by bending a suitably cut sheet metal blank into U-shape, the rear wall of the sheet metal support being preferably curved or rounded in conformity with the bight portion of the U. The curved rear wall of the support 36 has an opening for the reception of a steering column 40, the opening being large enough to permit insertion of a starting crank 41 which may be carried on the tractor as shown in Fig. 1 when it is not used for starting.

It will be seen that the sheet metal support 36 extends forwardly from a rearward portion of the torque tube casing 12 along opposite sides of the tubular portion of the torque tube casing and forwardly over the bell housing, and that the sheet metal support underlies the entire portion of the fuel tank which rearwardly overhangs the bracket 28. The fuel tank 26 is supported, at a forward portion thereof, on the seat 30 which is of relatively large width transversely of the tractor and therefore capable of securing the fuel tank against tilting transversely of the tractor. Tilting movement of the fuel tank on the seat 30 in fore and aft directions is prevented by the bracket 39 connecting the fuel tank with the sheet metal support 36, the sheet metal support itself being secured to the torque tube casing 12 as has been explained hereinbefore. The sheet metal structure and bracket 39 afford a support of relatively narrow width transversely of the tractor but are obviously well adapted to prevent rearward tilting of the fuel tank 26 on the longitudinally short seat 30 of bracket 28.

Mounted on the torque tube casing 12 between the side walls of the support 36 is a steering gear casing 42, the casing 12 having upwardly projecting lugs 43 to which the steering gear casing 42 is secured by means of bolts 44, the heads of these bolts projecting through suitable apertures in the left side wall of the support 36. The steering gear casing 42 has a side arm 45 which extends through a square opening 46 in the left side wall of the support 36, and a steering arm 47 is secured to a shaft extending through the side arm 45. The steering arm 47 is connected with a knuckle arm 48 of the steering linkage for the front wheels 1 and 2, as shown in Fig. 5, by a reach rod 49, and a hand wheel 50 is mounted at the rear end of the steering column 40 which, at its forward end is mounted in the steering gear casing 42. The tractor may be steered in a conventional manner by manipulation of the hand wheel 50, the hand wheel being connected with suitable worm and gear mechanism within the steering gear casing 42. The steering column 40 is supported rearwardly of the steering gear casing 42 on a post 51 which is screwed into an opening at the rear of the torque tube casing 12.

A channel 52 is welded to the steering column 40 within the space between the side walls of the support 36, the channel 52 serving to hold the starting crank 41 in the position in which it is shown in Fig. 1. The steering gear casing 42 occupies most of the space between the side walls of the support 36 at the forward end of the latter, and a space for the reception of tools or other accessories is available rearwardly of the steering gear casing 42 between the side walls of the support 36 and its curved rear wall connecting the side walls. This space is substantially closed at the bottom by the torque tube casing 12 and at the top by the bottom of the fuel tank 26, and it is accessible through a hole in the left side wall of the support 36, the hole being covered by a hinged lid 53. It will be seen that the sheet metal support 36 not only sustains the fuel tank 26 rearwardly of the bracket 28, but that it also furnishes a storage compartment or receptacle for tools or other accessories.

The driver's seat at the rear of the tractor comprises a relatively wide cushion 54 which is mounted between angle iron beams 55 and 56 secured to the upwardly arched rear axle structure of the tractor. A driver operating the tractor may take a position on the seat cushion 54 more or less directly behind the steering wheel 50 and, straddling the rear portion of the torque tube casing 12 with his legs, he may rest his feet on a tubular beam 57 which extends transversely of the tractor through the rearward downward enlargement of the torque tube casing 12. When so seated the driver has a wide range of vision of the ground ahead of him, which not only affords him a good view of the field at some distance ahead of the tractor, but also enables him to focus his eyes on a plant on the ground between the front wheels and to observe such plant while the tractor proceeds until the plant disappears under the cross beam 57 and under the rear axle structure. The plant, in order to be within the driver's range of vision, does not have to stand relatively close to the tread line of one or the other of the front wheels, but it may stand on a ground line extending longitudinally of the tractor centrally between the wheels, such a line being indicated by the dash-dotted line A in Fig. 5. Looking downwardly and forwardly from the seat along one side or the other of the tractor body forwardly of the rear axle structure, a driver will be able to observe a plant row on line A below the engine 7 and the torque tube casing 12, and neither the fuel tank 26 nor the bracket 28 nor the sheet metal support 36 will interfere with such visibility of a plant row on line A. The rearward taper of the fuel tank 1, as stated, gradually decreases the horizontal width of the fuel tank, and the vertical spacing of the fuel tank from the portion of the torque tube casing rearwardly of the bell housing make it possible for the driver to look past the torque tube casing which in turn is of such shape as to permit convenient visibility of the mentioned portion of line A. The sheet metal support 36 rises straight from the torque tube casing and has a transverse width not greater than the narrow, elongated tubular portion of the torque tube casing in rear of the bell housing as shown in Figs. 1 and 2. Due to this arrangement, the sheet metal support likewise does not interfere with the driver's convenient vision of the plants standing on line A below the engine 7 and the torque tube casing 12, and it is not necessary for the driver, in order to observe those plants, to lean over uncomfortably towards one side or the other, or otherwise assume a tiring position while driving the tractor. Preferably the driver will observe the plant row A by looking down at the right side of the tractor, and for convenience he may move over towards the right a short distance on the seat 54, so as to be entirely at ease in observing the plant row A below the engine 7 and torque tube casing 12 from a point at the right side of a vertical plane through line A.

In the tractor described hereinabove the engine 7 and the transmission housing 15 are connected with each other by the torque tube casing 12 without the use of any auxiliary connecting members such as side channels at opposite sides of the tractor, and the tractor may, therefore, be termed a "frameless" type tractor. The term "frameless" as used in the claims is intended to indicate the absence of a frame, such as side channels, for connecting the engine unit and the rear axle structure, but it is not intended to exclude other frame elements, for instance, a frame for mounting the motor on the front axle structure and for connecting the motor unit with the torque tube casing. The tractor herein shown and described is particularly adapted for work along a single plant row as indicated in Fig. 5 where the lines B and C indicate plant rows at opposite sides of the plant row A which is straddled by the tractor.

While in the foregoing a preferred embodiment of the invention has been shown and described, it should be understood that it is not intended to limit the invention to the details of construction herein shown and described, for various modifications within the scope of the claims may occur to persons skilled in the art.

It is claimed and desired to secure by Letters Patent:

1. A fuel tank mounting for tractors, comprising a pair of relatively opposed plate members extending parallel to a vertical plane longitudinally of the tractor, spacing means between said plate members, a bracket having a portion extending transversely of said plate members at opposite sides thereof, the width of said bracket portion transversely of the tractor being greater than the transverse spacing of said plate members; and a fuel tank having a forward portion supported on said bracket portion and a rearwardly tapering portion of gradually diminishing horizontal width supportingly connected with said spacing means rearwardly of said bracket.

2. A fuel tank mounting for tractors, comprising a sheet metal support having relatively opposed side walls extending parallel to a vertical plane longitudinally of the tractor and a rear wall connecting said side walls, a bracket having a portion extending transversely of said side walls beyond said support in opposite directions at the forward end thereof, a spacing member between said side walls intermediate said rear wall and said bracket portion, and a fuel tank carried on said bracket portion and said spacing member.

3. In a tractor having a forward engine unit and housing means enclosing power transmitting mechanism rearwardly of said engine unit; a fuel tank support extending transversely of the tractor rearwardly of said engine unit; a fuel tank mounted on said support and extending from one side thereof over said housing means in spaced relation thereto; a sheet metal structure having relatively opposed upstanding side walls underlying the entire length of said fuel tank at said one side of said support, and an end wall between said side walls remote from said support; and a supporting connection between said fuel tank and said sheet metal structure; said end wall and side walls of said sheet metal structure having lower edges adjacent to said housing means and rising therefrom to form a storage compartment between said fuel tank and underlying portions of said housing means.

4. In a tractor having a forward engine unit and housing means enclosing power transmitting mechanism rearwardly of said engine unit; a fuel tank support extending transversely of the tractor rearwardly of said engine unit; a fuel tank mounted on said support and extending from one side thereof over said housing means in spaced relation thereto; a sheet metal structure having relatively opposed upstanding side walls underlying the entire length of said fuel tank at said one side of said support, and an end wall between said side walls remote from said support; and a supporting connection between said fuel tank and said sheet metal structure; said end wall and side walls of said sheet metal structure having lower edges adjacent to said housing means and upper edges adjacent to said fuel tank to form a storage compartment between said fuel tank and underlying portions of said housing means.

5. In a tractor having a forward engine unit and housing means enclosing power transmitting mechanism rearwardly of said engine unit; a fuel tank support extending transversely of the tractor rearwardly of said engine unit; a fuel tank mounted on said support and extending from one side thereof over said housing means in spaced relation thereto; a sheet metal structure having relatively opposed upstanding side walls underlying the entire length of said fuel tank at said one side of said support, and an end wall between said side walls remote from said support; and a supporting connection between said fuel tank and said sheet metal structure; said end wall and side walls of said sheet metal structure having lower edges adjacent to said housing means and upper edges adjacent to said fuel tank to form a storage compartment between said fuel tank and underlying portions of said housing means, and one of said side walls having an opening affording access to said storage compartment.

6. In a tractor having a forward engine unit and housing means enclosing power transmitting mechanism rearwardly of said engine unit; a forward fuel tank support extending transversely of the tractor rearwardly of said engine unit; a fuel tank mounted on said support and extending rearwardly therefrom over said housing means in spaced relation thereto; a sheet metal structure having relatively opposed upstanding side walls underlying the entire length of said fuel tank rearwardly of said support, and a rear wall between said side walls at the rear of said fuel tank; and a rearward supporting connection between said fuel tank and said sheet metal structure; said side and rear walls of said sheet metal structure having lower edges adjacent to said housing means and rising therefrom to form a storage compartment between said fuel tank and underlying portions of said housing means.

7. In a tractor having a forward engine unit, a rearwardly tapering bell housing secured to the rear of said engine unit and an elongated tubular housing member extending rearwardly from said bell housing; a fuel tank overlying said bell housing and tubular housing member in spaced relation thereto; forward supporting means for said fuel tank; a sheet metal structure having a rear wall extending between said tubular housing member and a rear portion of said fuel tank rearwardly of said forward supporting means, and side walls extending forwardly from said rear wall at opposite sides of said tubular housing member and over said bell housing, the portions of said side walls extending at opposite sides of said tubular housing member being spaced from each other a distance not greater than the transverse width of said tubular housing member; means securing said side walls to said tubular housing member; and a supporting connection between said sheet metal structure and said fuel tank rearwardly of said forward supporting means.

8. In a tractor having a forward engine unit, a rearwardly tapering bell housing secured to the rear of said engine unit and an elongated tubular housing member extending rearwardly from said bell housing; a fuel tank overlying said bell housing and tubular housing member in spaced relation thereto; forward supporting means for said fuel tank; a sheet metal structure having a rear wall extending between said tubular housing member and a rear portion of said fuel tank rearwardly of said forward supporting means, and parallel vertical side walls extending forwardly from said rear wall at opposite sides of said tubular member and over said bell housing; said side walls being spaced from each other a distance not greater than the transverse width of said tubular housing member; means securing said side walls to said tubular housing member; and a supporting connection between said sheet metal structure and said fuel tank rearwardly of said forward supporting means.

9. In a tractor having a forward engine unit, a rearwardly tapering bell housing secured to the rear of said engine unit and an elongated tubular housing member extending rearwardly from said bell housing; a fuel tank having a bottom wall in proximity to the forward end of said bell housing and extending upwardly and rearwardly over said bell housing and said tubular housing member, and supporting means for said fuel tank including a sheet metal structure forming a rear wall and opposite side walls of a storage compartment between said fuel tank and the underlying portions of said bell housing and tubular housing member; said bell housing and tubular housing member forming the bottom of said storage compartment, and said bottom wall of said fuel tank forming a closure for the top of said storage compartment.

10. In a tractor having a forward engine unit, a rear axle structure, a change speed transmission casing adjacent to said rear axle structure and a body structure between said engine unit and said change speed transmission casing including a rearwardly tapering bell housing adjacent to said engine unit and a relatively long, narrow tubular extension of the reduced end of said bell housing; a fuel tank arranged above said body structure in an elevated position relative to said engine to permit gravity feed of fuel from said tank to said engine, said fuel tank having a portion of substantial horizontal width overlying said bell housing and a rearwardly tapering portion of gradually diminishing horizontal width overlying said tubular extension; and means for sustaining said fuel tank in said elevated position including a support within the space between said fuel tank and said body structure.

11. In a tractor having a forward engine unit, a rear axle structure, a change speed transmission casing adjacent to said rear axle structure and a body structure between said engine unit and said change speed transmission casing including a rearwardly tapering bell housing adjacent to said engine unit and a relatively long, narrow tubular extension of the reduced end of said bell housing; a fuel tank arranged above said body structure in an elevated position relative to said engine to permit gravity feed of fuel from said tank to said engine, said fuel tank having a portion of substantial horizontal width overlying said bell housing and a rearwardly tapering portion of gradually diminishing horizontal width overlying said tubular extension; and forward and rearward supporting means for sustaining said fuel tank in said elevated position, said rearward supporting means being mounted on said tubular extension and extending upwardly therefrom into supporting engagement with said rearwardly tapering portion of said fuel tank.

12. In a tractor having a forward engine unit, a rear axle structure, a change speed transmission casing adjacent to said rear axle structure and a body structure between said engine unit and said change speed transmission casing including a rearwardly tapering bell housing adjacent to said engine unit and a relatively long, narrow tubular extension of the reduced end of said bell housing; a fuel tank arranged above said body structure in an elevated position relative to said engine to permit gravity feed of fuel from said tank to said engine, said fuel tank having a portion of substantial horizontal width overlying said bell housing and a rearwardly tapering portion of gradually diminishing horizontal width overlying said tubular extension; a supporting bracket for said fuel tank adjacent to said engine unit having a rearwardly extending portion overlying said bell housing, means securing said fuel tank portion of substantial horizontal width to said rearwardly extending portion of said bracket, and means supportingly connecting said rearwardly tapering portion of said fuel tank with said tubular extension of said bell housing.

CONRAD E. FRUDDEN.
WALTER F. STREHLOW.